US012605692B2

(12) United States Patent　　(10) Patent No.:　US 12,605,692 B2
　　Satake　　(45) Date of Patent:　Apr. 21, 2026

(54) LIQUID ABSORBING BODY

(71) Applicant: MITSUBISHI PENCIL COMPANY, LIMITED, Tokyo (JP)

(72) Inventor: Atsunori Satake, Gunma (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 1103 days.

(21) Appl. No.: 17/630,431

(22) PCT Filed: Apr. 21, 2020

(86) PCT No.: PCT/JP2020/017253
　　§ 371 (c)(1),
　　(2) Date: Jan. 26, 2022

(87) PCT Pub. No.: WO2021/019850
　　PCT Pub. Date: Feb. 4, 2021

(65) Prior Publication Data
　　US 2022/0280913 A1　　Sep. 8, 2022

(30) Foreign Application Priority Data

Jul. 30, 2019　(JP) ................................ 2019-139971

(51) Int. Cl.
　　*B01J 20/20*　　(2006.01)
　　*B01J 20/28*　　(2006.01)
　　*B01J 20/30*　　(2006.01)
(52) U.S. Cl.
　　CPC ......... *B01J 20/20* (2013.01); *B01J 20/28042* (2013.01); *B01J 20/28054* (2013.01); *B01J 20/3007* (2013.01); *B01J 20/3078* (2013.01); *B01J 2220/42* (2013.01)
(58) Field of Classification Search
　　CPC .... B01J 20/20; B01J 20/205; B01J 20/28042; B01J 20/28054; B01J 20/3007; B01J 20/3078; B01J 2220/42
　　See application file for complete search history.

(56) References Cited

U.S. PATENT DOCUMENTS

| | | | |
|---|---|---|---|
| 4,684,560 A * | 8/1987 | Minten ................... | H05K 3/424 |
| | | | 428/408 |
| 6,139,989 A | 10/2000 | Kawakubo et al. | |
| 2002/0038864 A1 | 4/2002 | Hirohata et al. | |
| 2002/0102202 A1 | 8/2002 | Katoh et al. | |
| 2002/0141934 A1* | 10/2002 | Gogotsi ................... | C30B 33/00 |
| | | | 423/448 |
| 2005/0170237 A1 | 8/2005 | Nakagawa et al. | |
| 2008/0044656 A1* | 2/2008 | Ko ......................... | H01M 4/587 |
| | | | 252/502 |
| 2013/0210301 A1 | 8/2013 | Hirao et al. | |
| 2015/0257251 A1* | 9/2015 | Kagawa .............. | H01L 23/3737 |
| | | | 252/79 |

FOREIGN PATENT DOCUMENTS

| | | | |
|---|---|---|---|
| JP | 48-079788 A | 10/1973 | |
| JP | 04-200336 A | 7/1992 | |
| JP | 07-010707 A | 1/1995 | |
| JP | 08-180869 A | 7/1996 | |
| JP | 08-227714 A | 9/1996 | |
| JP | 10-012217 A | 1/1998 | |
| JP | 2002-293665 A | 10/2002 | |
| JP | 2005-149792 A | 6/2005 | |
| JP | 2008-218262 A | 9/2008 | |
| JP | 4596814 B2 | 10/2010 | |
| JP | 2012-082258 A | 4/2012 | |
| JP | 2018-162177 A | 10/2018 | |
| KR | 10-2017-0106925 A | 9/2017 | |
| WO | WO-2017/116657 A1 | 7/2017 | |

OTHER PUBLICATIONS

Office Action dated May 1, 2025 in KR 10-2022-7003232, with English machine translation.

* cited by examiner

*Primary Examiner* — Stuart L Hendrickson

(74) *Attorney, Agent, or Firm* — Foley & Lardner LLP

(57)　　ABSTRACT

A liquid absorbing body according to the present invention contains amorphous carbon and crystalline carbon particles dispersed in the amorphous carbon; the content of the crystalline carbon particles is from 60% by mass to 90% by mass based on the total mass of the amorphous carbon and the crystalline carbon particles; the degree of orientation as determined by a wide-angle X-ray scattering method is 75% or more; and the open porosity as determined in accordance with JIS R 1634 (1998) is 10% or more.

7 Claims, No Drawings

LIQUID ABSORBING BODY

CROSS-REFERENCE TO RELATED APPLICATIONS

This application is the U.S. National Stage of PCT/JP2020/017253, filed Apr. 21, 2020, which claims priority to JP 2019-139971, filed Jul. 30, 2019.

FIELD

The present invention relates to a liquid-absorbing body.

BACKGROUND

In recent years, various liquid-absorbing bodies capable of absorbing oil and moisture have been proposed for applications such as sliding members and carriers.

PTL 1 discloses a liquid-absorbing open porous body comprising a porous body having spherical bubbles, wherein oil and moisture absorption ratios are both 100 weight % or greater.

PTL 2 discloses a fuel cell comprising a structure and, in which a liquid fuel is permeated into a substrate and an air electrode surface formed on an outer surface of the substrate is exposed to air. The fuel cell comprises a unit cell or a connected body of two or more of the unit cells connected at intervals. The unit cell shares, as a cell support, a substrate on the surface of which fuel electrode, electrolyte layer, and air electrode are laminated in this order. The substrate is a carbonaceous porous body made of amorphous carbon or a composite of amorphous carbon and carbon powder, having an average pore size of 1 to 100 μm and a porosity of 10 to 85%, and having liquid permeability by capillary action and electrical conductivity.

PTL 3 discloses a liquid-absorbing core made of a porous ceramic for transpiration, wherein the liquid-absorbing core is formed by baking an inorganic powder and comprises an inorganic skeleton portion and a communication hole, surrounded by the skeleton portion, through which a solution is movable to the surface of the liquid-absorbing core.

CITATION LIST

Patent Literature

[PTL 1] JP 2012-82258
[PTL 2] JP 4596814
[PTL 3] JP H7-10707

SUMMARY

Technical Problem

Although the liquid-absorbing open porous bodies of PTL 1 and 3 have excellent liquid absorbency, the type of liquids that can be absorbed are limited due to insufficient chemical stability.

Although the carbonaceous porous body of PTL 2 has good stability, there is room for improvement in liquid absorbency.

Therefore, there is a need to provide a carbonaceous liquid-absorbing body having good liquid absorbency.

Solution to Problem

The present inventors have intensively studied and consequently discovered that the above object can be achieved by the following means, and have thus completed the present invention. The present invention is described as follows:

<<Aspect 1>> A liquid-absorbing body containing amorphous carbon and crystalline carbon particles dispersed in the amorphous carbon, wherein it has a content ratio of the crystalline carbon particles, based on a total mass of the amorphous carbon and the crystalline carbon particles, of 60 to 90 mass %, a degree of alignment, measured by a wide-angle X-ray scattering method, of 75% or greater, and an open porosity, in accordance with JIS R 1634:1998, of 10% or greater.

<<Aspect 2>> The liquid-absorbing body according to Aspect 1, wherein the crystalline carbon particles are at least one selected from the group consisting of graphene, carbon nanotube, fullerene, and graphite particles.

<<Aspect 3>> The liquid-absorbing body according to Aspect 1 or 2, wherein it has a hydrophilized surface.

<<Aspect 4>> The liquid-absorbing body according to any one of Aspects 1 to 3, wherein it has a maximum inscribed sphere diameter of 2 mm or less.

<<Aspect 5>> The liquid-absorbing body according to any one of Aspects 1 to 4, wherein it has a cylindrical shape or a prismatic shape, and wherein the degree of alignment is a degree of alignment in an axial direction.

<<Aspect 6>> The liquid-absorbing body according to any one of Aspects 1 to 4, wherein it is sheet-like, and wherein the degree of alignment is a degree of alignment in a planar direction.

<<Aspect 7>> A liquid-absorbing block, comprising a plurality of the liquid-absorbing bodies according to Aspect 5, and configured by bundling to integrate the plurality of the liquid-absorbing bodies having a cylindrical shape or a prismatic shape.

<<Aspect 8>> A liquid-absorbing block, comprising a plurality of the liquid-absorbing bodies according to Aspect 6, and configured by stacking to integrate the plurality of the liquid-absorbing bodies which are sheet-like.

<<Aspect 9>> A method for using the liquid-absorbing body according to any one of Aspects 1 to 6 or the liquid-absorbing block according to Aspect 7 or 8, comprising impregnating at least a portion of the liquid-absorbing body or the liquid-absorbing block in a liquid.

<<Aspect 10>> A method for manufacturing a liquid-absorbing body, comprising kneading an amorphous carbon precursor and crystalline carbon particles to prepare a precursor composition, extruding the precursor composition, and heat-treating the extruded precursor composition.

Advantageous Effects of Invention

According to the present invention, a carbonaceous liquid-absorbing body having good liquid absorbency can be provided.

DESCRIPTION OF EMBODIMENTS

<<Liquid-Absorbing Body>>

The liquid-absorbing body of the present invention contains amorphous carbon and crystalline carbon particles dispersed in the amorphous carbon, wherein the content ratio of the crystalline carbon particles, based on the total mass of the amorphous carbon and the crystalline carbon particles, is 60 to 90 mass %, the degree of alignment, measured by a wide-angle X-ray scattering method, is 75% or greater, and the open porosity, in accordance with JIS R 1634:1998, is 10% or greater.

The present inventors have discovered that a chemically stable liquid-absorbing body can be provided by the above configuration. Without being bound by theory, this is considered to be due to the fact that fine gaps formed between well-aligned crystalline carbon particles and the amorphous carbon can act as flow paths for a liquid.

The liquid-absorbing body of the present invention preferably has a hydrophilized surface from the viewpoint of improving liquid absorbency. The hydrophilization can be carried out by, for example, removing a surface layer of the liquid-absorbing body via a polishing process, such as centerless processing, or a machining process.

The maximum inscribed sphere diameter of the liquid-absorbing body of the present invention may be greater than 0 mm. The maximum inscribed sphere diameter is preferably 2.0 mm or less, 1.5 mm or less, 1.2 mm or less, 1.0 mm or less, 0.8 mm or less, 0.6 mm or less, or 0.5 mm or less from a manufacturing point of view.

When the liquid-absorbing body of the present invention has a cylindrical shape, the roundness, i.e., the magnitude of deviation of a circular form from a geometrically perfect circle, of the base of the liquid-absorbing body in accordance with JIS B 0621-1984 can be 0.01 μm or more, 0.05 μm or more, 0.1 μm or more, 0.3 μm or more, 0.5 μm or more, 0.7 μm or more, or 1 μm or more, and can be 5 μm or less, 4 μm or less, 3 μm or less, or 2 μm or less.

When the liquid-absorbing body of the present invention has a cylindrical shape, the cylindricity, i.e., the magnitude of deviation of a cylindrical form from a perfect cylinder, of the liquid-absorbing body in accordance with JIS B 0621-1984 can be 0.01 μm or more, 0.05 μm or more, 0.1 μm or more, 0.3 μm or more, 0.5 μm or more, 0.7 μm or more, or 1 μm or more, and can be 12 μm or less, 10 μm or less, 8 μm or less, 6 μm or less, 5 μm or less, 4 μm or less, 3 μm or less, or 2 μm or less.

The degree of alignment of the liquid-absorbing body of the present invention, measured by a wide-angle X-ray scattering method, can be 75% or greater, 80% or greater, 85% or greater, or 90% or greater, and can be 100% or less, less than 100%, 98% or less, or 95% or less.

The open porosity, i.e., the open porosity calculated by the following formula (1), of the liquid-absorbing body of the present invention in accordance with JIS R 1634:1998 can be 10% or greater, 15% or greater, or 20% or greater, and can be 50% or less, 45% or less, 40% or less, 35% or less, or 30% or less.

$$P_0 = \{(W_3 - W_1)/(W_3 - W_2)\} \times 100 \tag{1}$$

wherein $P_0$ is the open porosity (%), $W_1$ is the dry mass, $W_2$ is the submerged mass, and $W_3$ is the saturated mass.

In one embodiment, the liquid-absorbing body of the present invention can have a cylindrical shape or a prismatic shape. As such, the above degree of alignment is a degree alignment in the axial direction. When the liquid-absorbing body of the present invention has a cylindrical shape, the above maximum inscribed sphere diameter may be the diameter of the base. When the liquid-absorbing body of the present invention has a prismatic shape, the above maximum inscribed sphere diameter may be the diameter of the incircle of the base.

In one embodiment, the liquid-absorbing body of the present invention can be sheet-like. As such, the above degree of alignment is a degree of alignment in the planar direction. As such, the above maximum inscribed sphere diameter may be the thickness of the thickest portion in the liquid-absorbing body.

Hereinafter, each constituent element of the present invention will be described.

<Amorphous Carbon>

The amorphous carbon can be obtained by, for example, carbonizing a precursor composition containing a curable resin and a solvent. The method for manufacturing the liquid-absorbing body will be described in detail.

<Crystalline Carbon Particles>

The crystalline carbon particles may be carbon particles dispersed in the amorphous carbon.

Examples of the crystalline carbon particles include graphene, carbon nanotube, fullerene, and graphite particles. These may be used alone or in combination.

The shape of the crystalline carbon particles is not particularly limited, and may be, for example, planar, array-like, or spherical.

The average particle size of the crystalline carbon particles can be 10 nm or more, 20 nm or more, 30 nm or more, 50 nm or more, 70 nm or more, 100 nm or more, 200 nm or more, 300 nm or more, 500 nm or more, 700 nm or more, 1 μm or more, 2 μm or more, or 3 μm or more, and can be 20 μm or less, 18 μm or less, 15 μm or less, 13 μm or less, 10 μm or less, or 7 μm or less. In the present specification, the average particle size refers to the median diameter (D50) calculated based on volume in a laser diffraction method. By having the average particle size of the crystalline carbon particles at 10 nm or more, dispersion is easily carried out and thickening is suppressed. As a result, filling of a mold and defoaming treatment can be easily carried out. By having the average particle size of the crystalline carbon particles at 20 μm or less, precipitation of the crystalline carbon particles is suppressed. As a result, dispersion can be easily carried out.

The content ratio of the crystalline carbon particles in the liquid-absorbing body, based on the total mass of the amorphous carbon and the crystalline carbon particles, can be 60 mass % or greater, 65 mass % or greater, 70 mass % or greater, or 75 mass % or greater, and can be 90 mass % or less, 85 mass % or less, or 80 mass % or less. By having the content ratio of the crystalline carbon particles at 60 mass % or greater, alignment is improved. As a result, liquid absorbency can be improved. By having the content ratio of the crystalline carbon particles at 90 mass %, sufficient flow paths in the liquid-absorbing body can be ensured.

<<Liquid-Absorbing Block>>

The liquid-absorbing block of the present invention comprises a plurality of the above liquid-absorbing bodies.

In one embodiment, when the above liquid-absorbing bodies have a cylindrical shape or a prismatic shape, the liquid-absorbing block is configured by bundling to integrate the liquid-absorbing bodies having a cylindrical shape or a prismatic shape.

In another embodiment, when the above liquid-absorbing bodies are sheet-like, the liquid-absorbing block is configured by stacking to integrate the liquid-absorbing bodies which are sheet-like.

According to the above liquid-absorbing block, a liquid can be absorbed not only by the liquid absorbency of the liquid-absorbing body itself but also by a gap between liquid-absorbing bodies, and thus liquid absorbency can be further enhanced.

<Method for Using Liquid-Absorbing Body or Liquid-Absorbing Block>

The method of the present invention for using the above liquid-absorbing body or liquid-absorbing block comprises impregnating at least a portion of the above liquid-absorbing body or liquid-absorbing block in a liquid.

Specifically, when an end surface of the above liquid-absorbing body or liquid-absorbing block is impregnated in a liquid, and the end surface is perpendicular to the alignment of the crystalline carbon particles, the liquid is absorbed along the alignment of the crystalline carbon particles, and thus rapid liquid absorption is possible.

<<Method for Manufacturing Liquid-Absorbing Body>>

The method of the present invention for manufacturing the liquid-absorbing body comprises kneading an amorphous carbon precursor and crystalline
      carbon particles to prepare a precursor composition,
   extruding the precursor composition, and
   heat-treating the extruded precursor composition.

<Preparation of Precursor Composition>

The precursor composition is prepared by kneading an amorphous carbon precursor and crystalline carbon particles.

As the amorphous carbon precursor, for example, a phenolic resin, a furan resin, an imide resin, an epoxy resin, polyvinyl chloride (PVC), an unsaturated polyester resin, or a derivative thereof, such as chlorinated polyvinyl chloride (CPVC), can be used. These may be used alone or as a mixture of two or more.

As the crystalline carbon particles, the crystalline carbon particles relating to the liquid-absorbing body can be used.

The content ratio of the crystalline carbon particles in the liquid-absorbing body, based on the total mass of the amorphous carbon and the crystalline carbon particles, can be 60 mass % or greater, 65 mass % or greater, 70 mass % or greater, or 75 mass % or greater, and can be 90 mass % or less, 85 mass % or less, or 80 mass % or less. By having the content ratio of the crystalline carbon particles at 60 mass % or greater, alignment is improved. As a result, liquid absorbency can be improved. By having the content ratio of the crystalline carbon particles at 90 mass % or less, sufficient flow paths in the liquid-absorbing body can be ensured. This content ratio, depending on the residual carbon ratio, i.e., the mass ratio of the amorphous carbon precursor after carbonization with respect to the amorphous carbon precursor before carbonization, can be adjusted so as to satisfy the predetermined content ratio of the crystalline carbon particles in the liquid-absorbing body mentioned above. The residual carbon ratio of the amorphous carbon precursor can be altered by changing, for example, the type, the molecular weight, or a substituent of the amorphous carbon precursor.

The precursor composition may further contain a dispersant. As the dispersant, for example, sodium stearate can be used.

The precursor composition preferably contains a plasticizer from the viewpoint of improving open porosity. As the plasticizer, for example, a dicarboxylic acid diester such as diisobutyl phthalate can be used. The content ratio of the plasticizer is preferably 18.0 mass % or less, 17.5 mass % or less, or 17.0 mass % or less from the viewpoint of having the appropriate open porosity.

The kneading can be carried out with a publicly known stirring means such as a Disper.

<Extrusion>

The extrusion can be carried out using a publicly known extrusion means.

The molding speed may be any speed.

<Heat Treatment>

The heat treatment can be carried out at a temperature of, for example, 500° C. or higher, 600° C. or higher, 700° C. or higher, 800° C. or higher, 900° C. or higher, or 1000° C. or higher, and 2000° C. or lower, 1900° C. or lower, 1800° C. or lower, 1700° C. or lower, or 1600° C. or lower.

The present invention will be specifically described with reference to the Examples and Comparative Examples. However, the present invention is not limited thereto.

<<Preparation of Liquid-Absorbing Body or Liquid-Absorbing Block>>

Example 1

41 mass parts of polyvinyl chloride (PVC) (residual carbon ratio of 30%) as the amorphous carbon precursor, 41 mass parts of scaly natural graphite (average particle size of 8 μm) as the crystalline carbon particles, 1 mass part of sodium stearate as the dispersant, and 17 mass parts of diisobutyl phthalate as the plasticizer were mixed and dispersed (mixing and dispersion time of 20 min; the same applies hereinafter) with a Henschel mixer, kneaded with a pressure kneader and a roller, and extruded. Thereafter, the extruded mixture was subjected to a heat treatment at 200° C. in an air atmosphere, followed by a heat treatment at 1000° C. for 10 hours in a nitrogen gas atmosphere, whereby a cylindrical liquid-absorbing body of Example 1 having a diameter of 0.56 mm and a length of 30 mm was prepared.

The diameter (core diameter) of the above carbon shaft was measured (n=100) with an outer diameter laser measuring instrument (LS-3030, Keyence Corporation). The same applies to the following Examples and Comparative Examples.

Example 2

Except that the die shape during extrusion was set to a flat rectangular shape, a sheet-like liquid-absorbing body of Example 2, having a thickness of 0.2 mm, a width of 5 mm, and a length of 30 mm, was prepared with the same mixture and the same process as in Example 1. The width and thickness were measured with a micrometer.

Example 3

40 liquid-absorbing bodies of Example 1 were prepared, the ends thereof were aligned and bundled, and thereafter one end was bound with epoxy resin and integrated to obtain a liquid-absorbing block of Example 3.

Example 4

Except that the die diameter during extrusion was narrowed, a cylindrical liquid-absorbing body of Example 4, having a diameter of 0.16 mm and a length of 30 mm, was prepared with the same mixture and the same process as in Example 1.

Example 5

The carbon shaft obtained in Example 1 was hydrophilized by grinding the carbon shaft down to φ0.4 mm via centerless processing to prepare a liquid-absorbing body of Example 5.

Comparative Example 1

Except that the composition of the precursor composition was changed as indicated in Table 1 and molded into a spring-like shape, a liquid-absorbing body of Comparative Example 1 was prepared in the same manner as in Example 1. The "CPVC" in Table 1 refers to chlorinated polyvinyl chloride (residual carbon ratio of 50%).

Comparative Examples 2 and 3

Excepted that the composition of the precursor composition was changed as indicated in Table 1, the liquid-absorbing bodies of Comparative Examples 2 and 3 were prepared in the same manner as in Example 1.

<<Evaluation>>

<Characterization>

The degree of alignment in the axial direction or the planar direction of each sample was measured by a wide-angle X-ray scattering method. The open porosity of each sample was calculated in accordance with JIS R 1634:1998.

<Liquid Absorption Test>

Each of the prepared liquid-absorbing bodies or liquid-absorbing blocks was heated at 100° C. for 30 min to remove absorbed moisture, and was then submerged in a liquid stored in a container and allowed to stand. As the liquid, two types, "purified water" and a "synthetic hydrocarbon-based gear oil (kinematic viscosity of 66.3 mm²/s: 40° C.)", were used.

After immersing for a predetermined amount of time, the immersed liquid-absorbing body or liquid-absorbing block was taken out. Excess liquid on the surface was imbibed and wiped off with, for example, a Kim towel. Thereafter, the liquid-absorbing body or liquid-absorbing block was weighed, and the weight increase ratio was calculated.

For the samples of Example 1 and Comparative Example 3, each sample was further cut in half in a direction perpendicular to the molding process direction and tested in the same manner as above to determine the difference from the above weight increase ratio.

The composition and evaluation results of each of the Examples and Comparative Examples are shown in Table 1.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Component of composition | Crystalline carbon particles | Type | | | | scaly natural graphite | | | | |
| | | Content | 41 | 41 | 41 | 41 | 41 | 33 | 20 | 37 |
| | Amorphous carbon source | Type | | | PVC | | | CPVC | | PVC |
| | | Residual carbon ratio (%) | | | 30 | | | | 50 | 30 |
| | | Content | 41 | 41 | 41 | 41 | 41 | 50 | 60 | 44 |
| | Dispersant | Type | | | | sodium stearate | | | | |
| | | Content | 1 | 1 | 1 | 1 | 1 | 0.8 | 0.8 | 0.5 |
| | Plasticizer | Type | | | | diisobutyl phthalate | | | | |
| | | Content | 17 | 17 | 17 | 17 | 17 | 16.2 | 19.2 | 18.5 |
| Specification of carbon material | Content ratio of crystalline carbon particles (mass %) | | | | 77 | | | 57 | 40 | 74 |
| | Degree of alignment (%) | | | | 91 | | | 68 | 64 | 91 |
| | Open porosity (%) | | | | 25 | | | 24 | <1 | 4 |
| | Molding speed (m/s) | | >10 | 1 | >10 | <0.1 | >10 | | | >10 |
| | Shape | | cylindrical | sheet-like | cylindrical block | cylindrical | cylindrical | spring-like | cylindrical | cylindrical |
| | Maximum inscribed sphere diameter (mm) | | 0.5 | 0.2 | 0.5 | 0.15 | 0.4 | 0.5 | 0.5 | 0.5 |
| | Roundness (μm) | | 3.58 | — | — | — | 0.11 | — | — | — |
| | Cylindricity (μm) | | 12.49 | — | — | — | 0.15 | — | — | — |
| | Presence of hydrophilic processing | | N | N | N | N | Y | N | N | N |
| Mass increase ratio due to liquid absorption of liquid-absorbing body as prepared (mass %) | Water | After 5 min | 1.8 | 2.0 | — | 1.6 | 5.2 | 0.0 | 0.0 | 0.0 |
| | | After 10 min | 2.2 | 2.3 | — | 2.4 | 7.0 | 0.0 | 0.0 | 0.0 |
| | | After 30 min | 3.6 | 3.6 | — | 3.9 | 7.0 | 0.0 | 0.0 | 0.0 |
| | | After 24 h | 10.4 | 9.9 | — | 10.7 | 10.9 | 1.2 | 0.0 | 0.0 |
| | Oil | After 5 min | 1.8 | 2.7 | 17.7 | 2.6 | — | 0.8 | 2.7 | 1.9 |
| | | After 10 min | 8.0 | 7.8 | 18.1 | 8.1 | — | 1.0 | 1.3 | 1.9 |
| | | After 30 min | 10.7 | 10.0 | 19.6 | 10.9 | — | 1.2 | 1.3 | 1.9 |
| | | After 24 h | 17.0 | 16.3 | 32.6 | 17.2 | — | 1.8 | 1.3 | 2.8 |
| Difference in mass increase ratio before and after splitting (mass %) | Water | After 5 min | 0.2 | — | — | — | — | 0.0 | — | 0.0 |
| | | After 10 min | 0.8 | — | — | — | — | 0.2 | — | 0.0 |
| | Oil | After 5 min | 4.0 | — | — | — | — | 0.2 | — | -1.0 |
| | | After 10 min | -0.2 | — | — | — | — | 0.3 | — | -1.0 |

From Table 1, it can be understood that the samples of Examples 1 to 5, in which the content ratio of the crystalline carbon particles was 60 to 90 mass %, the alignment thereof was 75% or greater, and the open porosity thereof was 10% or greater, had good liquid absorbency, compared to the samples of Comparative Examples 1 and 2, which had lower content ratios of crystalline carbon particles and lower alignment, and Comparative Example 3, which had a lower open porosity as well.

In Example 1, it was found that the liquid absorption ratio increased when the liquid-absorbing body was split in half. Thus, it can be understood that an end surface contributed to liquid absorption, i.e., a liquid penetrated in the axial direction of the liquid-absorbing body along the alignment direction.

Among the Examples, the sample of Example 3, in which a plurality of cylindrical liquid-absorbing bodies were bundled, had a greater mass increase ratio than other Examples. Thus, it can be understood that a region between liquid-absorbing bodies also contributed to liquid absorption. Further, the sample of Example 5, which was subjected to centerless processing, had a higher initial liquid absorption ratio than the sample of Example 1, which was not subjected to centerless processing.

The invention claimed is:

1. A liquid-absorbing body containing amorphous carbon and crystalline carbon particles dispersed in the amorphous carbon, wherein it has
   a content ratio of the crystalline carbon particles, based on a total mass of the amorphous carbon and the crystalline carbon particles, of 60 to 90 mass %,
   a degree of alignment, of the crystalline carbon particles, measured by a wide-angle X-ray scattering method, of 75% or greater,
   an open porosity, in accordance with JIS R 1634:1998, of 10% or greater, and
   a cylindrical shape or a prismatic shape, and wherein the degree of alignment is a degree of alignment in an axial direction.

2. The liquid-absorbing body according to claim 1, wherein the crystalline carbon particles are at least one selected from the group consisting of graphene, carbon nanotube, fullerene, and graphite particles.

3. The liquid-absorbing body according to claim 1, wherein it has a hydrophilized surface.

4. The liquid-absorbing body according to claim 1, wherein it has a maximum sphere diameter which can be inscribed in the liquid-absorbing body of 2 mm or less.

5. A method for manufacturing a liquid-absorbing body according to claim 1, comprising
   kneading an amorphous carbon precursor and crystalline carbon particles to prepare a precursor composition,
   extruding the precursor composition, and
   heat-treating the extruded precursor composition.

6. A liquid-absorbing block, comprising a plurality of the liquid-absorbing bodies according to claim 1, and
   configured by bundling to integrate the plurality of the liquid-absorbing bodies having a cylindrical shape or a prismatic shape.

7. A method for using the liquid-absorbing block according to claim 6, comprising impregnating at least a portion of the liquid-absorbing body or the liquid-absorbing block in a liquid.

* * * * *